No. 896,580. PATENTED AUG. 18, 1908.
R. E. ROBESON & F. F. SCHAUWEKER.
MUD GUARD.
APPLICATION FILED AUG. 29, 1907.
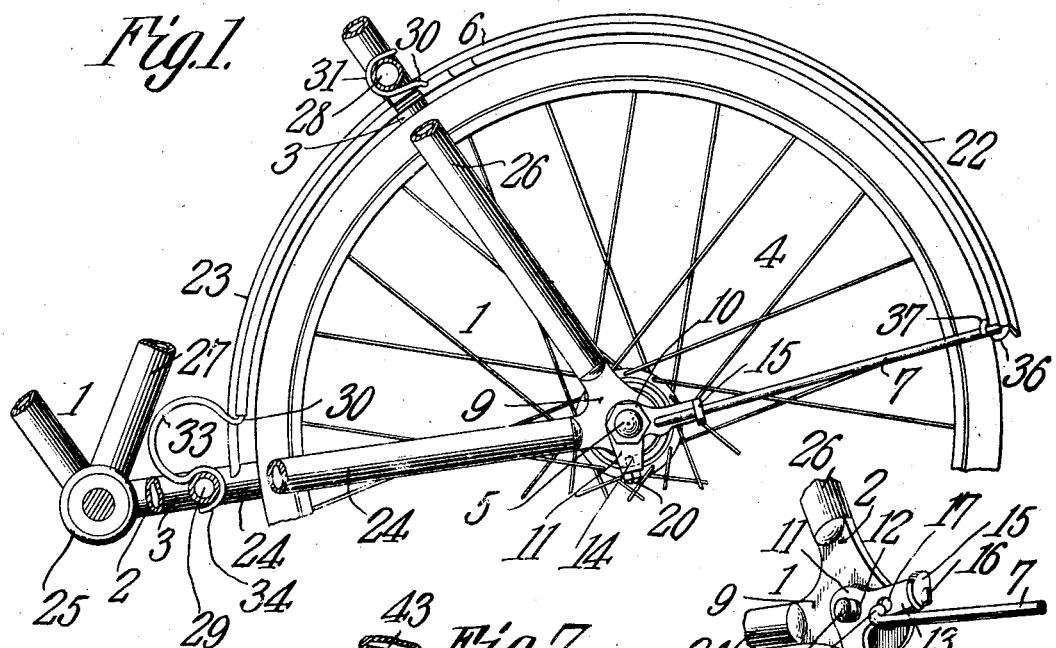
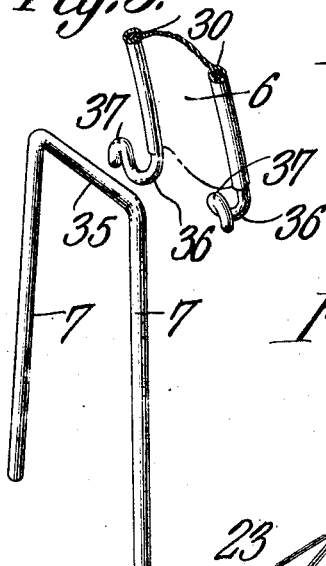
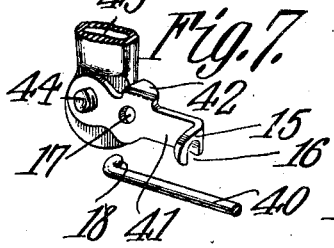
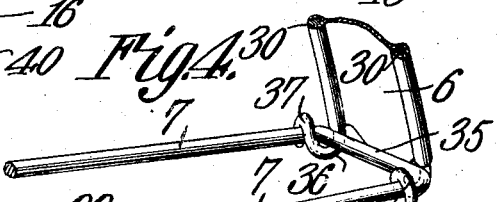
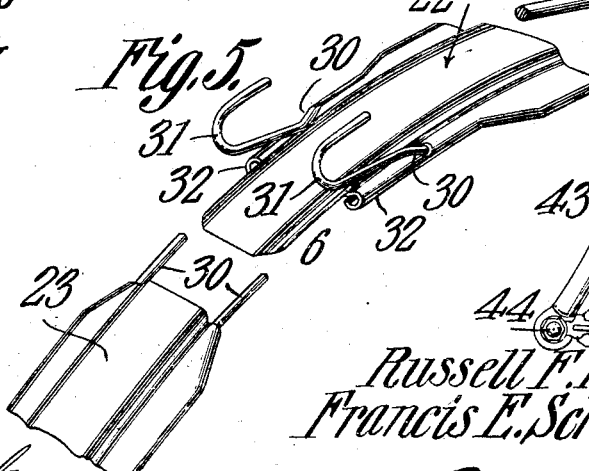
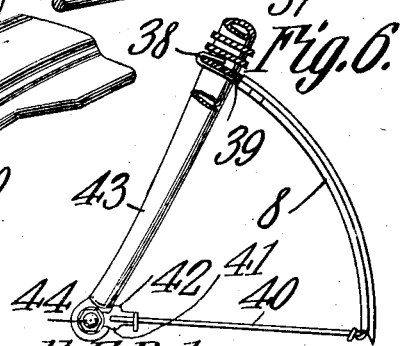
Russell F. Robeson AND
Francis F. Schauweker
INVENTORS.

UNITED STATES PATENT OFFICE.

RUSSELL E. ROBESON AND FRANCIS F. SCHAUWEKER, OF CLEVELAND, OHIO.

MUD-GUARD.

No. 896,580.     Specification of Letters Patent.     Patented Aug. 18, 1908.

Application filed August 29, 1907. Serial No. 390,670.

*To all whom it may concern:*

Be it known that we, RUSSELL E. ROBEson and FRANCIS F. SCHAUWEKER, citizens of the United States, residing at Cleveland, in the county of Cuyahoga and State of Ohio, have invented a new and useful Mud-Guard, of which the following is a specification.

This invention relates to an attachment for bicycles known as a mud guard to protect a rider from mud and water thrown outwardly by centrifugal action from the front and rear wheels.

The main object of the invention is to provide a simple cheap and strong means for rigidly fastening a mud guard to the front and rear wheels of a cycle, without the use of bolts, screws or other like means, but depending entirely on self attached fastening devices which secure the guards in place, free from all looseness and rattling.

Another object of the invention refers to the manner of joining the two parts which together make the rear wheel guard and to the simple but rigid connection of the rear end of the guard which attach them to the body of the cycle.

In the accompanying drawing: Figure 1 is a side elevation of a portion of the rear of a bicycle with the improved mud guard in place thereon. Fig. 2 is a perspective view of the lower end of the rear fork showing a clip in place on the outer end of the axle and a brace rod about to be put in place. Fig. 3 is a perspective view of the lower rear end of the rear mud guard about to be connected. Fig. 4 is a similar view of the same parts in fixed position. Fig. 5 is a perspective view of the intermediate joint separated, of the rear mud guard and hooks for attaching said guard to the cycle frame. Fig. 6 is a side elevation partly in section of the front fork illustrating the attachment of the mud guard thereto. Fig. 7 is a perspective view of one of the clips on the front fork with the guard brace separated therefrom.

Similar reference numerals are used for the same parts on all the figures.

Referring to Figs. 1 to 5 both inclusive, the numeral 1 indicates the rear part of the frame of a bicycle, divided as usual into two sides 2 and 3 between which the rear wheel 4 rotates on a horizontal axle 5 provided with any suitable type of bearing (not shown). The ends of the rear axle 5 are each bolted to a bearing plate 9 from each of which extends a tubular rod 24 brazed to the pedal shaft bearing case 25 and cross connected in front of the wheel by a bridge or brace piece 29. Similar tubes 26 extend upwardly and forwardly from the bearing plates 9 to the central standard 27 rising from the pedal shaft bearing case 25. A bridge or brace piece 28 also connects the tubes 26 above the wheel. The frame just described is common to the large majority, if not to all bicycles and no claim is made thereto but to make clear the manner of attaching the mud guard to the frame, this somewhat detailed description of the latter is given. Covering about one half of the upper periphery of the rear wheel 4 is a mud guard 6 fastened securely to the rear frame 1 by hooks properly disposed and by a brace rod 7 reaching from the axle 5 to the lower rear end of the mud guard 6. The front wheel is covered by a similar guard 8 hereinafter described.

The rear axle 5 passes through a bearing plate 9 on each side of the rear frame 1 and is usually fastened to said plates by nuts 10 and a washer, but in this instance a clip 11 is placed between each nut and a bearing plate 9 to hold the free ends of a double brace rod 7 separably attached to the rear end of the mud guard.

The clips 11 each comprise a small right angled plate made of thin, strong metal, such as steel, having an opening 12 at the axial apex of the two arms 13 and 14 of the clip, through which openings in the clips, the ends of the axle 5 pass. The arm 13 has its end 15 bent outwardly at a right angle and a substantially vertical slot 16 cut in said end 15 from the bottom to the center thereof. A hole 17 is also made in the arm 13 for the inwardly turned inner end 18 of one of the brace rods 7. The arms 14 of the links 11 project downwardly and each has its end 19 bent inwardly at a right angle, through which end an approximately vertical screw 20 with a jam nut 21 is threaded.

The mud guard 6 is made in two parts, one 22 which overlies the top and rear of the wheel 4, and the other 23, covering the front of the wheel.

The connection between the parts 22 and 23 lies just below the bridge piece 28 and is formed as shown in Fig. 5. Within the side edges of each part 22 and 23 of the guard is rolled a stiff wire 30 which wires project from a narrowed portion of the part 22 just before they reach the forward end and terminate in hooks 31. The wires 30 project from the upper narrowed end of the part 23 parallel to each other and are adapted to fit into sockets 32 on the part 22 just beneath the hooks 31. At the lower end of the part 23, the wires 30 emerge from their sheathes a short distance above the extreme end and after being bent into large circular bows 33 end in hooks 34 which, when in place engage the bridge 29 from behind and as the hooks 31 catch the bridge 28 in front, the tendency will be to hold the joint between the two parts of the mud guard firm and secure, especially as the springs 33 assist.

The brace rods 7 are connected to the rear ends of the mud guard 6 and 8 by a separable joint now to be described. The brace rods 7 are connected at their outer ends by a straight piece 35 integral with each rod 7. The wires 30 in each side of the mud guard project outwardly therefrom at its rear end and turn upwardly to form loops 36 of such size as to receive the cross piece 35 of the brace rods 7. The wires are then, each turned outwardly to form a hook 37 which will overlie each rod 9. As thus constructed, the joint is assembled by holding the mud guard and brace rods in the position indicated in Fig. 3. Now if the mud guard be moved below the connecting piece 35 a sufficient distance, the hooks 37 will pass between the rods 7 because said rods gradually separate towards their inner ends and with a straight line pull the piece 35 will be seated in the loops 36. If the parts be now swung to the position represented in Fig. 4 the hooks 37 will catch over the rods 7 and hold the rods and mud guard in proper relation to each other.

The forward ends 18 of the brace rods 7 are as heretofore mentioned, turned at right angles to the rods and are quite short. These ends are placed in the holes 17 in the bearing plates and the rods raised until they enter the slots 16 where they are stopped in position to secure the outer end of the mud guard.

The mud guard 8 for the front wheel covers about one quarter of its surface and is fastened by hooks 38 engaging the front of the bridge or arch 39 of the front forks. The lower end of the mud guard is connected to the brace rods 40 in exactly the same manner as the rear guard and its braces are joined. The clip 41 however is slightly different, it is a straight piece instead of a right angled one and has an inwardly turned lug 42 which bears against the rear edge of the lower end of the front fork 43 as clearly shown in Fig. 7. The front axle 44 extends through an opening in the clip 41 in like manner as through the rear clip and is fastened by nuts in a similar manner.

Having thus described the invention, what is claimed is:—

1. A mud guard for vehicle wheels comprising a concentric strip for covering the periphery of a wheel, a hook on each side of the upper end of said strip to engage with the wheel frame, a loop ending in a lateral hook at each side of the lower end of said guard, and a pair of supporting rods detachably connected to said loops and hooks and to the wheel axle.

2. A mud guard for vehicle wheels comprising a concentric strip for covering the periphery of a wheel, each side edge being stiffened by a wire terminating at its upper end by an outward rearwardly turned hook, and at its lower end by the ends of said stiffening wires bent first into parallel loops and then each loop into an outward hook.

3. A mud guard for vehicle wheels comprising a concentric sheet metal strip for covering the periphery of a wheel each side edge of said strip having a stiffening wire terminating at the upper end in two external hooks, and at the other end with two small semicircular loops parallel to each other and bent inwardly terminating in laterally curved hooks.

4. A mud guard for a vehicle wheel comprising a shield concentric therewith and extending on each side of its vertical radius, a supplemental shield removably connected at one end by a separable joint to the forward end of the main shield, and resiliently connected at its opposite end to the frame of the vehicle.

5. A mud guard for a vehicle wheel comprising a shield concentric therewith and extending on each side of its vertical radius, a supplemental shield having pins on one end adapted to enter suitable sockets in an end of the main shield, and having curved springs at the other end terminating in hooks to connect with the vehicle frame and hold the supplemental shield in place.

6. A mud guard for a vehicle wheel comprising a shield concentric therewith and extending on each side of its vertical axis, a pair of rods detachably connected to one end of said shield and to the wheel axle, means on the opposite end of said shield for connecting the latter to the vehicle frame, a removable supplemental shield having one end attached by a separable joint to the forward end of the main shield and supported by it, and springs at the opposite end of said supplemental shield terminating in hooks for engaging the vehicle frame and holding the supplemental shield in place.

7. A mud guard for a vehicle wheel comprising a two part concentrically curved shield connected endwise by a sliding joint, clips adapted to be fixed on each end of the wheel axle, a brace rod bent upon itself and detachably connected to one end of said mud guard and to each clip, springs on the opposite end of the mud guard terminating in hooks for attachment to the wheel frame, and other hooks intermediate the ends of the mud guard and at the junction of the two part shield for further connecting the mud guard to the wheel frame.

In testimony that we claim the foregoing as our own, we have hereto affixed our signatures in the presence of two witnesses.

RUSSELL E. ROBESON.
FRANCIS F. SCHAUWEKER.

Witnesses:
 CHAS. E. FERRELL,
 C. E. HILL.